(No Model.) 2 Sheets—Sheet 1.

G., F. R., G. H., H. O. & C. S. JONES.
COVERED DISH.

No. 399,753. Patented Mar. 19, 1889.

Witnesses.
Lloyd B. Wight
Baltis DeLong

Inventors.
George Jones — Francis Ralph Jones.
George Henry Jones — Horace Overton Jones.
Charles Samuel Jones,
By their attorneys,
Baldwin, Davidson & Wight.

(No Model.) 2 Sheets—Sheet 2.

G., F. R., G. H., H. O. & C. S. JONES.
COVERED DISH.

No. 399,753. Patented Mar. 19, 1889.

United States Patent Office.

GEORGE JONES, FRANCIS RALPH JONES, GEORGE HENRY JONES, HORACE OVERTON JONES, AND CHARLES SAMUEL JONES, OF STOKE-UPON-TRENT, ENGLAND.

COVERED DISH.

SPECIFICATION forming part of Letters Patent No. 399,753, dated March 19, 1889.

Application filed October 22, 1888. Serial No. 288,849. (No model.)

*To all whom it may concern:*

Be it known that we, GEORGE JONES, FRANCIS RALPH JONES, GEORGE HENRY JONES, HORACE OVERTON JONES, and CHARLES SAMUEL JONES, manufacturers of pottery, subjects of the Queen of Great Britain, all residing at Trent Pottery, Stoke-upon-Trent, England, have invented certain new and useful Improvements in Covered Dishes, of which the following is a specification.

We form an earthenware or china covered dish with the cover in two halves or divisions. One half or division we make in one piece with the dish. The other half we make separate and capable of being turned to bring it either into a position to cover over the top of the dish or to bring it into a position either under or over the fixed half or division of the cover. The dish and cover might be of other material than earthenware or china; but, preferably, we form it of earthenware or china, as described.

The drawings show an earthenware or china covered dish formed in the above manner.

Figure 1:
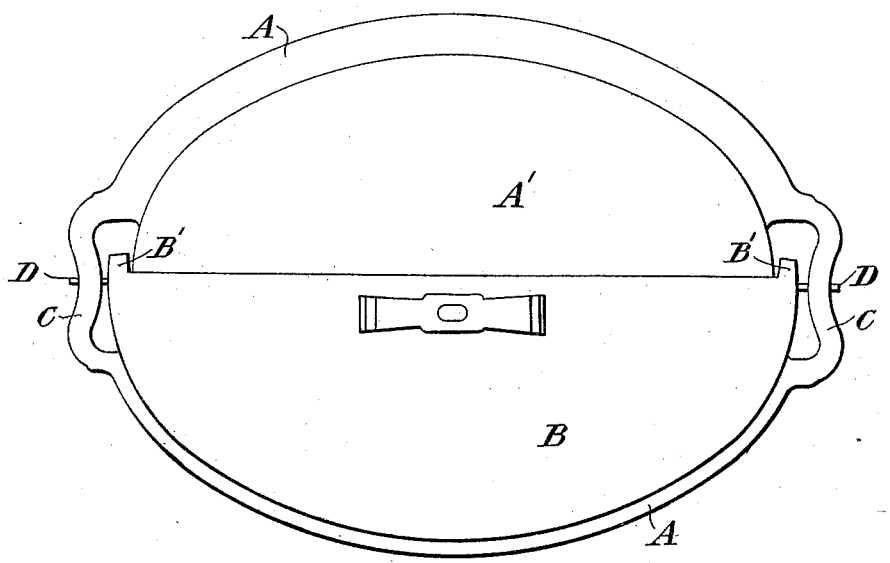
Figure 2:
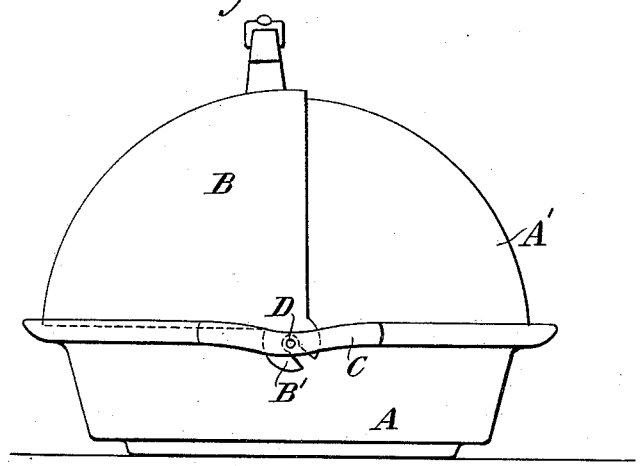
Figure 3:
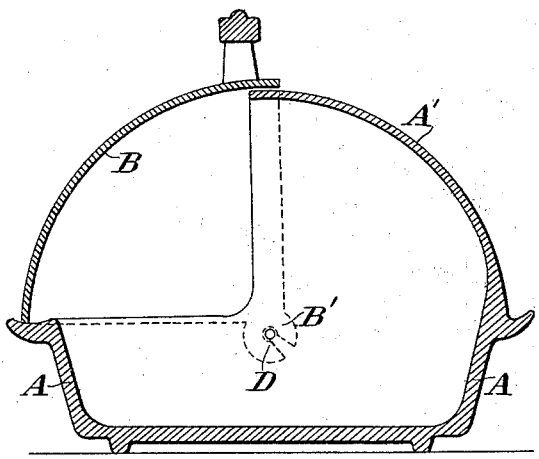
Figure 4:
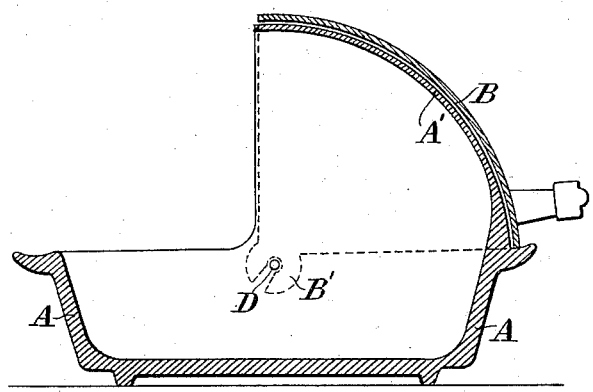

Figure 1 is a plan view, and Fig. 2 an end view, of the covered dish. Fig. 3 is a cross-section of the dish with the cover closed, and Fig. 4 a cross-section with the cover open.

A is a dish shown to be oval, but which might be circular or of other form, having made in one piece with it one half, A', of a dome cover.

B is the other half of the dome cover. The dish at each end is formed with a handle, C, projecting from it, through each of which is a slot. The movable half of the cover is formed with pieces B', projecting downward from it to enter into these slots. Pins D are passed through the handles and through the projecting pieces B' of the movable part of the cover and form pivots for the movable part of the cover to turn on.

The pins D may either be passed through holes formed through the pieces B', in which case the cover would always remain attached to the dish, or they may be passed through slots in these pieces, as shown in the drawings, in which case the movable half of the cover may readily be lifted away from the dish, if it is desired to do so.

Other means than those above described may also be adopted for jointing the movable half of the cover to the dish to allow of its being turned either into a position below or above the fixed half of the cover and concentric with it.

The dish is preferably formed, as shown, with an outwardly-projecting flange all around it at the top, upon which the cover rests when it is in either its open or closed position.

The movable part of the cover is in the drawings shown to pass over the top of the fixed part of the cover when open; but, as above stated, it might, if preferred, be formed to turn under the fixed part of the cover.

Having now particularly described and ascertained the nature of our said invention and in what manner the same is to be performed, we declare that what we claim is—

The combination, substantially as hereinbefore set forth, of the dish having a portion of its cover formed integrally with its lower portion, the movable section of the cover, the downwardly-projecting lugs thereof slotted, as described, the slotted handles of the dish, into which the lugs project, and the pivots for the downwardly-projecting lugs between the dish and the handles.

GEORGE JONES.
   FRANCIS RALPH JONES.
   GEORGE HENRY JONES.
   HORACE OVERTON JONES.
   CHARLES SAMUEL JONES.

Witnesses:
 JOSEPH GODFREY NORCUP,
 THOMAS HAMMERSLEY.

*Clerks to George Jones & Sons, Stoke-on-Trent.*